US010920147B2

(12) United States Patent
Tahmouresinia

(10) Patent No.: US 10,920,147 B2
(45) Date of Patent: *Feb. 16, 2021

(54) FLAME OR FIRE RETARDING AGENTS AND THEIR MANUFACTURE AND USE

(71) Applicant: Fernando Tahmouresinia, Hildesheim (DE)

(72) Inventor: Fernando Tahmouresinia, Hildesheim (DE)

(*) Notice: Subject to any disclaimer, the term of this patent is extended or adjusted under 35 U.S.C. 154(b) by 22 days.

This patent is subject to a terminal disclaimer.

(21) Appl. No.: 15/775,699

(22) PCT Filed: Nov. 11, 2016

(86) PCT No.: PCT/EP2016/077416
§ 371 (c)(1),
(2) Date: May 11, 2018

(87) PCT Pub. No.: WO2017/081240
PCT Pub. Date: May 18, 2017

(65) Prior Publication Data
US 2018/0327670 A1 Nov. 15, 2018

(30) Foreign Application Priority Data

Nov. 12, 2015 (DE) .................. 10 2015 119 558.5

(51) Int. Cl.
C09K 21/02 (2006.01)
C09D 5/18 (2006.01)
C09D 7/61 (2018.01)
D06M 13/432 (2006.01)
D06M 11/13 (2006.01)
D06M 11/82 (2006.01)
D21H 17/07 (2006.01)
D21H 17/65 (2006.01)
D21H 17/66 (2006.01)
B27K 3/16 (2006.01)
B27K 3/20 (2006.01)
B27K 3/32 (2006.01)
C09K 21/10 (2006.01)
D21H 21/34 (2006.01)
H01B 7/295 (2006.01)
C08K 3/16 (2006.01)
C08K 3/38 (2006.01)
C08K 3/016 (2018.01)

(52) U.S. Cl.
CPC .............. *C09K 21/02* (2013.01); *B27K 3/163* (2013.01); *B27K 3/20* (2013.01); *B27K 3/32* (2013.01); *C09D 5/185* (2013.01); *C09D 7/61* (2018.01); *C09K 21/10* (2013.01); *D06M 11/13* (2013.01); *D06M 11/82* (2013.01); *D06M 13/432* (2013.01); *D21H 17/07* (2013.01); *D21H 17/65* (2013.01); *D21H 17/66* (2013.01); *D21H 21/34* (2013.01);

*H01B 7/295* (2013.01); *B27K 2240/30* (2013.01); *C08K 3/016* (2018.01); *C08K 3/38* (2013.01); *D06M 2200/30* (2013.01)

(58) Field of Classification Search
CPC ....... C09K 21/02; C09K 21/10; D06M 11/82; D06M 11/13; D06M 13/432; D06M 2200/30; C09D 7/61; C09D 5/185; D21H 17/66; D21H 17/65; D21H 17/07; D21H 21/34; H01L 37/295; C08K 3/38; C08K 3/016; B27K 3/32; B27K 3/20; B27K 3/163; B27K 2240/30; H01B 7/295
See application file for complete search history.

(56) References Cited

U.S. PATENT DOCUMENTS

| 5,247,005 A | 9/1993 | von Bonin et al. |
| 5,288,429 A | 2/1994 | von Bonin et al. |
| 5,443,894 A | 8/1995 | Pollock et al. |
| 7,045,476 B1 | 5/2006 | Lally |

FOREIGN PATENT DOCUMENTS

| AT | 507049 A1 | 1/2010 |
| DE | 4007060 A1 | 9/1991 |
| DE | 4117074 A1 | 11/1992 |
| DE | 4117077 A1 | 11/1992 |
| DE | 69617506 T2 | 5/2002 |

(Continued)

OTHER PUBLICATIONS

English Translation of AT507049 (Year: 2008).*
International Search Report of PCT/EP2017/050361 dated Apr. 19, 2017.

Primary Examiner — Andrew J. Oyer
(74) Attorney, Agent, or Firm — Mayer Brown LLP

(57) ABSTRACT

The invention relates to an agent, in particular a flame retarding agent and/or a fire retarding agent, for reducing the combustibility and flammability of various materials or matters, e.g. like wood and wood products, textiles, paper, cardboard, fibers and fabrics, paints, including composites and/or composite materials therewith, the manufacture of the composition and methods of using the agent and/or the corresponding combination of its constituents to reduce combustibility and flammability. An exemplary composition in dry form (powder) for 1 l of aqueous solvent, in particular for 1 l of water, contains borax in an amount of 30 to 70 wt.-%, boric acid of 30 to 70 wt.-%, sodium chloride (NaCl) in a maximum amount of less than 5 wt.-%, and, if desired, urea in an amount up to 5 g; based in each case on the composition as 100 wt.-%. However, the compositions are preferably free from urea.

14 Claims, No Drawings

(56) References Cited

FOREIGN PATENT DOCUMENTS

| | | | |
|---|---|---|---|
| DE | 102014110002 A1 | 1/2016 |
| EP | 0735187 B1 | 12/2001 |
| EP | 2208594 A1 | 7/2010 |
| GB | 1242290 A | 8/1971 |
| NL | 7702660 A | 9/1978 |

* cited by examiner

FLAME OR FIRE RETARDING AGENTS AND THEIR MANUFACTURE AND USE

This application is a national stage entry of International Application No. PCT/EP2016/077416, filed on Nov. 11, 2016, which claims benefit of DE Patent Application No. 10 2015 119 558.5 filed on Nov. 12, 2015; which are incorporated herein by reference in their entirety to the full extent permitted by law.

The invention relates to an agent, in particular a flame retarding agent and/or a fire retarding agent, for reducing the flammability and/or combustibility of various materials or substances, such as, for example, wood and wood products, textiles and textile products, paper and paper products, carton, fibers and fabrics, paints, etc., including composites and/or composite materials therewith, the preparation of the composition and methods using the composition and/or the corresponding combination of its individual constituents for the reduction of flammability and/or flammability.

Fire and its discovery is one of the most important events in the history of mankind, with enormous impact on human development. In addition to its function, which is essential for human life, the fire also has a disadvantage, namely, its burning property, which leads to numerous material and financial damages in our society.

Easily flammable materials and substances are dangerous, as they are prone to catch fire and ignite fires. Therefore, it is important to find an effective way to provide such flammable substances with flame and/or fire protection, which make such materials and substances less dangerous.

The invention relates to an agent for reducing the flammability and/or combustibility of materials, in particular to flame retarding agents and/or fire retarding agents.

Known flame retardants are mixtures of organic and/or inorganic substances which are intended to prevent or at least to inhibit a taking fire or merely an igniting of wood or wood-like materials, plastics, textiles, paper, cardboard, carton, artificial and natural fibers as well as fabrics, paints, or products thereof, building materials, insulation materials, electrical and/or cable insulation, etc. In addition, they are intended in particular to make the combustion of these materials more difficult.

Indeed many substances or groups of substances are known in the art as such which have a flammability inhibiting effect. However, the circumstance that, as a rule, efforts were made to use compound mixtures and not individual compounds or substances for these purposes, it can already be seen that the properties and effects of these compounds or substances as such have been considered not yet being optimal for the chosen purpose. The concrete making-up under adaptation to all the boundary conditions of the individual case, in particular taking into account possibly undesired side effects, also takes place from the point of view of environmental compatibility. A further criterion is the complexity of the respective production process.

A flame retardant for wood basic materials is known from the document DE 10361878, in which melamine resins are used in conjunction with boric acids or boric acid salts. Melamine resins are regarded as physiologically critical, since a release of formaldehyde is to be expected under exposure to heat.

From the document DE 3030242, a further flame retardant for wood has been used based on an aqueous solution containing borax, in addition to boric acid. From the document DE 19618444 a cellulosic insulating material is known, the fire protection agent of which is based on boric acid or also borax, which agents are used either as dry powders before or after a treatment with calcium chloride solution. Finally, from the document AT 507049 a flame retardant is known based on a mixture of boric acid, borax, ammonium nitrate and urea, which is used in the form of an aqueous solution.

The different compositions of these flame retarding agents show that efforts have always been made to achieve synergy effects, hence effects and properties, which are not or at least not optimally represented, in isolated form, by individual compounds or substances, such as, for example, boric acid, various ammonium compounds, melamine derivatives etc. In addition, there is the problem that some of these compounds or substances or even material compositions, in the event of a fire, liberate environmentally harmful, in some cases toxic, side effects.

Against this background, it is an object of the invention to provide an agent of the kind described at the outset which does not damage the material to be protected and, in particular, does not release any toxic gases. Moreover, the preparation of the agents and their use should be simple and economical very beneficial. This object is achieved with such as agent having the features of claim 1.

Surprisingly, it has now been found that the objective is fully achievable with a flame and/or fire retarding agent which consists of or comprises solely boric acid, borax, alkali metal chloride, preferably sodium chloride, and, if desired, urea in the stated composition. The flame retarding agent and/or fire retarding agent according to the invention thus contains no ammonium nitrate, no halogenated constituents and no melamine compounds and, in preferred embodiments, also dispenses with urea. A flame retarding agent and/or fire retarding agent composed in this sense fulfills all requirements, including a simple and very cost-effective producability.

This flame retarding agent and/or fire retarding agent can be used in particular for the protection of materials comprising cellulose and/or lignin, such as wood, wood-containing and/or wood-type materials, and wood products (e.g. doors, windows, parquet, laminate, paneling, ceilings; crates, wooden shelves, furniture; wooden building materials such as rafters, laths, wood for roof trusses or ceiling rests, etc.; for example, wooden parts and/or walls of heat cabins and saunas), textiles and textile products; of paper and paper products, cardboard, cartons, cardboard packaging; fibers and fabrics, artificial and natural fibers, as well as fabrics therewith; plastics and plastic products; insulating materials and insulation products, including thermal insulation materials and insulation products, electrical and/or cable insulation and such for all types of electrical installations; paints and paint products, etc.; including composites and/or composite materials and/or basic and/or building materials with the above-mentioned materials and/or matters.

The invention for reducing the flammability and/or combustibility of materials consists of a mixture of boric acid ($H_3BO_3$), borax ($Na_2B_4O_7 \cdot 10H_2O$), at least one alkali metal chloride, preferably sodium chloride; and, if desired, urea ($CO(NH_2)_2$) as an optional constituent. However, agents according to the invention preferably contain no urea or these only in comparatively small amounts; i.e. then, for example, preferably in an amount of only 0 to 1.0 parts by weight, in the agent according to the invention defined below.

Thus, the invention relates to an agent for reducing the flammability and/or combustibility of materials, in particular to flame retarding agents and/or fire retarding agents, comprising or consisting of a combination and/or a mixture of a) 30 to 70 wt.-% boric acid;
b) 30 to 70 wt.-% borax;
c) an alkali chloride, preferably sodium chloride, in an amount of less than 5 wt.-%; and
d) optionally urea up to 5 wt.-%;
in each case based on the combination and/or the mixture, as 100% by weight.

The advantages of the invention can be obtained when the agent according to the invention is used either in dry or solid form or when used in dissolved form, for example, in an aqueous solvent and in particular in aqueous solution. For the use of the agent it is advisable to dissolve the dry or solid form of the agent in an aqueous solvent in order to apply it to the material to be treated and/or to introduce it into the material to be treated. This achieves the absorption capacity for the agent in the material to be treated. Both use variants of the agent and the preparation methods of these agents are described within the scope of the present invention. It has been shown that, especially by the above-mentioned combination and/or the mixture with the stated ranges of quantities, a surprisingly simple and yet enormously effective solution for the still existing enormous need for simple, inexpensive, and environmentally friendly, processable and usable agents could be provided, for reducing the flammability and/or combustibility of various materials, in particular as flame retarding agents and/or fire retarding agents.

The above dry or solid agent of the present invention can be provided in any solid form, e.g. depending on the intended use, as individual constituents for individual mixing in the stated amounts or also premixed. According to the invention usual dry forms are, e.g., powders, granulates, pellets, and they can be present in amorphous, crystalline and/or partially crystalline form, optionally also in the form of conventional hydrates. If desired, the above dry or solid agent according to the invention can be granulated or pelletized. A coating of the dry or solid granulated or pelletized compositions according to the invention for the protection against moisture is not necessary, but in individual cases, also not excluded for special applications.

The invention and its advantages can therefore be realized surprisingly also with bulk of the constituents mentioned. The invention therefore also relates to an agent for reducing the flammability and/or combustibility of materials, in particular to flame retarding agents and/or fire flame retarding agents, comprising or consisting of the above mentioned combination and/or the above mentioned mixture in dry or solid and uncoated form. However, for the purpose of improving the flowability, customary lubricants for powder or particulate substances may be present in amounts customary per se.

The dry or solid agent according to the invention can be provided and/or stockpiled in any kind of small and large trading units, in particular also industrially conventional trading units, e.g., such as barrels, sacks, big packs, etc., and also be stockpiled in the silo or in containers.

The flammability and/or combustibility of the various materials and/or matters to be protected, as mentioned already above, can be immediately reduced by simply applying an aqueous solution of the agent according to the invention onto these materials and/or matters, and/or impregnating them and/or dipping them therein. As materials, let us once again mention, for example, as a material type, without wishing to limit the above list: wood, paper, textiles, fibers, fabrics. Plastics may also be treated as the material with the agent according to the invention.

The amount of the starting materials boric acid, borax, alkali chloride, preferably sodium chloride; and optionally urea, in the agent according to the invention, depending on the material and/or matter to be protected, from which the flammability and/or combustibility is to be reduced, can vary according to the invention within the ranges indicated in the claims or described herein.

The preferred amount in the agent according to the invention, as a combination and/or a mixture, according to the invention, of boric acid ($H_3BO_3$) is 30-70 wt.-%; of borax ($Na_2B4O_7*10H_2O$) 30-70 wt.-%; and at least one alkali metal chloride, preferably sodium chloride, but which is present in an amount of less than 5 wt.-%. The alkali metal chloride content is very advantageous for the effect and application according to the invention, but should be less than 5 wt.-% in order to avoid crystallization on prolonged standing of aqueous solutions of the combination and/or of the mixture. The wt.-% data are based on the combination and/or the mixture as 100 wt.-%.

The alkali metal chloride, preferably sodium chloride, is therefore present in the agent according to the invention in an amount of less than 5 wt.-%, preferably in an amount of less than 4.5 wt.-%, in particular in an amount of less than 4 wt.-%, more preferably in an amount of up to 3.5 wt.-%, in particular in an amount of up to 3 wt.-%, even more preferably in an amount of up to 2.5 wt.-%, in particular In an amount of up to 2 wt.-%, and particularly preferably in an amount of up to 1.5 wt.-%, in particular in an amount of up to 1 wt.-%; in each case based on the combination and/or the mixture, as 100 wt.-%. The minimum content of alkali metal chloride, preferably sodium chloride, in particular is 0.1 wt.-%, preferably 0.2 or 0.3 or 0.4 wt.-%, more preferably 0.5 wt.-%; likewise in each case based on the combination and/or the mixture as 100 wt.-%.

In terms of the amounts expressed, the alkali metal chloride, preferably sodium chloride, can be present in the agent according to the invention in an amount of from 0.1 wt.-% to less than 5 wt.-%, preferably 0.2 or 0.3 or 0.4 wt.-% to less than 5 wt.-%, more preferably from 0.5 wt.-% to less than 5 wt.-%, based in each case on the combination and/or the mixture as 100 wt.-%. In the agent according to the invention, the alkali metal chloride, preferably sodium chloride, can also be used in an amount of from 0.1 wt.-% to less than 4.5 wt.-%, preferably 0.2 or 0.3 or 0.4 wt.-% to less than 4.5 wt.-%, more preferably from 0.5 wt.-% to less than 4.5 wt.-%, in particular in each case up to an amount of less than 4 wt.-% are present; in each case based on the combination and/or the mixture, as 100 wt.-%.

In the agent according to the invention, the alkali metal chloride, preferably sodium chloride, can also be present in an amount of from 0.1% wt.-% to 3.5 wt.-%, preferably from 0.2 or 0.3 or 0.4 wt.-% to 3.5 wt.-%, more preferably from 0.5 wt.-% to 3.5 wt.-%, in particular in each case up to an amount of up to 3 wt.-%; In each case based on the combination and/or the mixture, as 100 wt.-%. In the composition according to the invention, the alkali metal chloride, preferably sodium chloride, can also be present in an amount of from 0.1 wt.-% to 2.5% wt.-%, preferably 0.2 or 0.3 or 0.4% wt.-%, up to 2.5 wt.-%, more preferably from 0.5 wt.-% to 2.5 wt.-%, in particular in each case up to an amount of up to 2 wt.-%; in each case based on the combination and/or the mixture, as 100 wt.-%.

The alkali metal chloride, preferably sodium chloride, is preferably present in the agent according to the invention in an amount of from 0.1 wt.-% to 1.5 wt.-%, preferably 0.2 or 0.3 or 0.4 wt.-% up to 1.5% by weight, more preferably from 0.5 wt.-% to 1.5 wt.-%, in particular in each case up to an amount of up to 1 wt.-%, In each case based on the combination and/or the mixture, as 100 wt.-%.

The agent according to the invention can either be particularly preferably free of urea ($CO(NH_2)_2$) or, if desired, urea can be comprised in an amount of up to 5 wt.-% (0 up to 5 wt.-%) to 4 wt.-% (0 to 4 wt.-%), more preferably in an amount up to 3, 2 or 1 wt.-% (0 up to 3, 2 or 1 wt.-%), and wholly particularly preferably in an amount of from 0 up to a maximum of 1 wt.-%.

A particular advantage of the invention is that no phosphates and also no addition of ammonium nitrate ($NH_4NO_3$) or also no addition of phosphates is necessary, as according to DE 1813361. Preferred agents according to the invention are therefore free of ammonium nitrate and/or phosphates; particularly preferably they are free of ammonium nitrate and phosphates.

A further advantage of the invention is that urea can also be dispensed with without impairing the action of the agent according to the invention or urea can be used only in comparatively small amounts compared with the prior art.

The present invention therefore provides a surprisingly simplified combination and/or simplified mixture for an agent for reducing the flammability and/or combustibility of materials, in particular a flame retarding agent and/or fire retarding agent, that as opposed to the material-specific agents of the prior art, surprisingly allows for a significantly widened range of application fields. For example, it is thus suitable, with only a minimal effort of adaptation for the respective application area and for a wide range of application fields. The flame retarding agent and/or fire retarding agent according to the invention can thus be used, as already mentioned, for the protection of wood, wood-containing and/or wood-type materials, and wood products (e.g. doors, windows, parquet, laminate, paneling, ceilings; crates, wooden shelves, furniture; wooden building materials such as rafters, laths, wood for roof trusses or ceiling rests, etc.; for example, wooden parts and/or walls of heat cabins and saunas), of textiles and textile products; of paper and paper products, cardboard, cartons, cardboard packaging; fibers and fabrics, artificial and natural fibers, as well as fabrics therewith; plastics and plastic products; insulating materials and insulation products, including thermal insulation materials and insulation products, electrical and/or cable insulation and such for all types of electrical installations; paints and paint products, etc.; including products thereof or therewith; of composites and/or composite materials and/or basic and/or building materials with the above mentioned materials and/or matters; and the like.

The invention thus also relates to the materials treated with the above-described agents according to the invention, in particular with flame and/or fire retarding agents, such as, in particular, cellulose- and/or lignin-comprising materials, such as, for example, wood, wood-containing and/or wood-type materials, and wood products (e.g. doors, windows, parquet, laminate, paneling, ceilings; crates, wooden shelves, furniture; wooden building materials such as rafters, laths, wood for roof trusses or ceiling rests, etc.; for example, wooden parts and/or walls of heat cabins and saunas), of textiles and textile products; of paper and paper products, cardboard, cartons, cardboard packaging; fibers and fabrics, artificial and natural fibers, as well as fabrics therewith; plastics and plastic products; insulating materials and insulation products, including thermal insulation materials and insulation products, electrical and/or cable insulation and such for all types of electrical installations; paints and paint products, etc.; including composites and/or composite materials and/or basic and/or building materials with the above mentioned materials and/or matters.

The invention also relates to products and/or composites and/or composite materials having the above materials or matters, the manufacture of the agent and methods or processes using the agent and/or the corresponding combination of its individual constituents or as a final pre-blending in the stated ranges of quantities for the reduction of flammability and/or combustibility.

The present invention also relates to the use of one of the above defined and described agents for reducing the flammability and/or combustibility of materials, in particular the use as flame retarding agent and/or fire retarding agent, for a wide range of application fields, which mandatorily require materials with provisions by a flame retarding agent and/or fire retarding agent, for example in accordance with legal requirements, or in which the provisions are desirable by a flame retarding agent and/or fire retarding agent for increasing safety, such as but not limited to materials such as wood or wood-type basic materials, plastics, textiles, paper, cardboard, carton, artificial and natural fibers as well as fabrics, paints, or products thereof, building materials, insulation materials, electrical and/or cable insulation and the like. In addition, reference is made to the above list of materials and/or the mentioned application areas.

The novel agent according to the invention, depending on the nature of the materials or matters, can be applied onto and/or sprayed in the surface area of the materials or matters to be protected, and/or the materials or matters can be dipped and/or impregnated with the inventive agent in the form of an aqueous and/or alcoholic solution. However, the novel agent can also be introduced originally with plastics, e.g. in the course of their preparation by polymerization or in a subsequent shaping processing, e.g. by extrusion, injection molding, etc. According to the invention, the flame- and/or flame retarding agent can, but need not, be already added in the production process of the materials. The materials to be treated can therefore, with regard to various respective applications of the materials, both during their manufacture and after their manufacture, be equipped in a very flexible manner. Accordingly, depending on the marketing and application purpose of the respective material, it may be decided batch-wise, whether the material is prepared untreated and only thereafter, if desired, or already in its production, is to be equipped with the agent according to the invention in a freely selectable amount. The person skilled in the art knows the respective methods or processes suitable for the material and/or matter to be protected in order to apply and/or to introduce an agent onto the respective material and/or matter and/or to incorporate them therein and/or such that this agent is absorbed by the respective material and/or matter.

According to the preferred features, this flame retarding agent and/or fire retarding agent can be provided as granulate or else in the form of an aqueous solution.

Thus, the invention also relates to an agent of the type described above, which is characterized in that it is present in solid form, preferably as a pellet or granulate.

The invention further relates to an agent of the type described above, which is characterized in that it is dissolved in an aqueous solvent, preferably in water.

In a particularly advantageous embodiment, the agent according to the invention of the type described above is characterized in that 50 to 200 g, preferably 75 to 125 g, of the solid combination and/or the solid mixture (solid blend) of the agent, as defined above, is present dissolved in an amount of the aqueous solvent, preferably water, relative to 1000 g of total solution.

For use, therefore, a solution is prepared of the above-described type of solid combination and/or solid mixture (solid combination or blend) of the constituent A of the agent comprising the defined amount of the flame- and/or flame-protecting solid dissolved in 1 l of the aqueous solvent, preferably water.

If appropriate, the respective dissolution process is supported by heating. Thus, e.g., the mixing together of the constituents advantageously is effected while heating to a temperature of up to about 60° C. A boiling or boiling of the solvent, respectively, is considered to be inappropriate (energy expenditure and solvent loss). Suitable agitators can support the dissolution process in a manner known per se. The completed solution of the agent according to the invention is applied to the material or matter, e.g., by pouring, spraying or brushing, or it is impregnated, dipped or mixed with the completed solution, or introduced in such manners into those already during the production of the material.

In the application, the agent according to the invention is allowed, in a time which is customary for the respective material, to act upon and/or infiltrate, and then one can process these to the flame protected and/or fire protected material or product (product, composite, composite material, insulating material, building material, etc.) in a usual manner customary to the skilled person in the art.

The agents according to the invention are distinguished from the compositions known in the art by surprising improvements and effects. Thus, the person skilled in the art could not retrieve from the prior art the advantageous effect of the constituent alkali metal chloride, particularly preferably sodium chloride, and there were also no indications from which it would have been stimulated to add alkali metal chloride, particularly sodium chloride. This applies in particular to the agents according to the invention, which are free of urea, or to such agents according to the invention which contain comparatively little urea and also no other plasticizers. In addition, it has also been found that the amounts and ratios described herein are advantageously effective for agents according to the invention comprising these alkali metal chlorides, particularly preferably sodium chloride, e.g., also by being able to be combined in a variety of ways with the materials to be treated, as described herein.

As already mentioned variously here, the invention has a number of advantages compared to the prior art, a few of which are intended to be mentioned by way of being representative and by way of example. The constituents and composition of the invention have no environmental impact. Smoke and exhaust fumes generated by the combustion of the invention are not polluting the environment. Materials and matters which are wetted by the invention or are impregnated by the invention are neither affected by premature deterioration, nor of quality degradation, i.e., the invention does not have an effect on the original properties of the material and/or matter to be protected.

A further advantage is that the constituents of the invention are easily and inexpensively to purchase, and the manufacture of the flame retarding and/or fire retarding agent is simple and high production rates are achieved.

With minor modifications of the formula of the composition of the invention, it is possible to achieve a reduction in the flammability and/or combustibility of other industrial products such as wood, paper and other pulps.

The flammability and/or combustibility of matters, textiles, fibers and fabrics can be immediately reduced in a simple way by impregnating them in an aqueous solution according to the invention or by applying the latter thereupon.

The composition of the invention leaves no undesirable traces on the treated materials and/or materials.

It is also possible to prepare an aqueous solution having the composition of the invention in the form of a spray with which a temporary non-flammable effect can be obtained, which thereafter, as desired, can be wiped off again.

The quality of a treated material and/or matter remains unchanged and is not adversely affected.

A further advantage of the invention is that it can be used in a wide range of industrial branches and products and, if desired, a temporary or also a permanent effect can be achieved. The non-flammable effect of treated textiles disappears completely by washing, but the effect is retained during dry cleaning.

Further advantages and advantageous embodiments of the invention can be gathered from the following examples and from the claims. All the features described in the description, the following examples and the claims may be essential to the invention, both individually and in any combination with one another.

EXAMPLES

In the following, the functionality of the invention will now be described in more detail by means of examples, but without intending to limit the scope of the invention as a result. The scope of the invention is defined in the patent claims and is supported by the above detailed description. The examples serve for further illustration.

To facilitate the mixing of the compositions in the examples below, it is recommended to heat the water to about 60° C.

Example 1: Flame Retarding Agent

Composition in dry form (powder) for aqueous solvent, in particular for water, to 1000 g total solution; with sum of borax and boric acid to 95 g:

| | |
|---|---|
| Borax | 30 to 65-70 g |
| Boric acid | 30 to 65-70 g |
| Sodium chloride (NaCl) | up to less than 5 g (max. <5 wt.-%) |
| Urea | 0 to 5 g |

Example 2: Flame Retarding Agent

Composition in dry form (powder) for aqueous solvent, in particular for water, to 1000 g total solution; with the sum of borax and boric acid to 100 g:

| | |
|---|---|
| Borax | 35 to 55 g |
| Boric acid | 35 bis 55 g |
| Sodium chloride (NaCl) | up to less than 5 g. |

Example 3: Flame Retarding Agent

Composition in dry form (powder) for aqueous solvent, in particular for water, to 1000 g total solution; with the sum of borax and boric acid to 100 g.

| | |
|---|---|
| Borax | 35 to 55 g |
| Boric acid | 35 to 55 g |
| Sodium chloride (NaCl) | 5 g (4.76 wt. %) |

Example 4: Flame Retarding Agent

Composition in dry form (powder) for aqueous solvent, in particular for water, to 1000 g total solution; with the sum of borax and boric acid to 100 g.

| | |
|---|---|
| Borax | 45 to 55 g |
| Boric acid | 45 to 55 g |
| Sodium chloride (NaCl) | up less to than 5 g (4.76 wt.-%) |

Example 5: Flame Retarding Agent

Composition in dry form (powder) for aqueous solvent, in particular for water, to 1000 g total solution; with sum of borax and boric acid to max. 95 g:

| | |
|---|---|
| Borax | 45 to 55 g |
| Boric acid | 45 to 55 g |
| Sodium chloride (NaCl) | up less to than 5 g (max. <5 wt.-%) |

Example 6: Flame Retarding Agent

Composition in dry form (powder) for aqueous solvent, in particular for water, to 1000 g total solution; with the sum of borax and boric acid to 100 g:

| | |
|---|---|
| Borax | 30 to 70 g |
| Boric acid | 30 to 70 g |
| Sodium chloride (NaCl) | up to 3 g (max. <2.91 wt.-%) |

Example 7: Other Flame Retarding Agents Analogously to Example 6

| Ex. No. | Borax (g) | Boric Acid (g) | NaCl (g) | NaCl (wt.-%) |
|---|---|---|---|---|
| 7a | 60 | 40 | 4 | 3.85 |
| 7b | 40 | 60 | 4 | 3.85 |
| 7c | 60 | 40 | 3 | 2.91 |
| 7d | 40 | 60 | 3 | 2.91 |
| 7e | 60 | 40 | 2 | 1.96 |
| 7f | 40 | 60 | 2 | 1.96 |
| 7g | 54 | 44 | 2 | 2.0 |
| 7h | 54.5 | 44 | 1.5 | 1.5 |
| 7i | 55 | 45 | 1 | 0.99 |
| 7j | 45 | 55 | 1 | 0.99 |
| 7k | 55 | 44 | 1 | 1.0 |
|  | 44 | 55 | 1 | 1.0 |
| 7l | 55 | 44.5 | 0.5 | 0.5 |
| 7m | 54.5 | 45 | 0.5 | 0.5 |
| 7n | 55 | 44.9 | 0.1 | 0.1 |

Example 8: Flame Retarding Agent-Application

The flame retarding agents of Examples 1 to 7 show excellent flame and fire protection properties, in particular in the case of wood-like or paper-like materials, in the test with a gas burner (flame heat, optionally adjustable, between 350 and about 1000° C.). Flame formation is prevented by the agent and, if an initial slight flame formation occurs during the action of the gas burner, the flame extinguishes very quickly and cannot maintain itself.

The invention claimed is:

1. An agent for reducing the flammability or combustibility of materials comprising a mixture of:
    a) boric acid in an amount from about 30% to about 70% by weight of the mixture;
    b) borax in an amount from about 30% to about 70% by weight of the mixture; and
    c) an alkali metal chloride in an amount of about 0.1% by weight to less than about 5% by weight of the mixture.

2. The agent of claim 1, wherein the agent is in a solid form.

3. The agent of claim 1, wherein the agent is in the form of pellets or granulates.

4. The agent of claim 1, wherein the agent is dissolved in an aqueous solvent.

5. The agent of claim 4, wherein the aqueous solvent is water.

6. The agent of claim 1, wherein from about 50 g to about 200 g of the mixture is dissolved in an amount of an aqueous solvent to provide about 1000 g of a total composition.

7. The agent of claim 1, wherein the alkali metal chloride is sodium chloride.

8. The agent of claim 1, wherein the alkali metal chloride is present in an amount of from about 0.1% to about 2.5% by weight of the mixture.

9. An agent for reducing the flammability or combustibility of materials, wherein the agent comprises a mixture of:
    a) boric acid in an amount from about 30% to about 70% by weight of the mixture;
    b) borax in an amount from about 30% to about 70% by weight of the mixture;
    c) an alkali metal chloride in an amount of about 0.1% by weight to less than about 5% by weight of the mixture; and
    d) urea in an amount of up to about 5% by weight of the mixture.

10. The agent of claim 9, wherein the agent is in a solid form.

11. The agent of claim 9, wherein from about 50 g to about 200 g of the mixture is dissolved in an amount of an aqueous solvent to provide about 1000 g of a total composition.

12. The agent of claim 11, wherein the aqueous solvent is water.

13. The agent of claim 9, wherein the alkali metal chloride is sodium chloride.

14. The agent of claim 9, wherein:
    a) the alkali metal chloride is present in an amount of from about 0.1% to about 2.5% by weight of the mixture; and
    b) the urea is present in an amount of less than about 5% by weight of the mixture.

* * * * *